US008463739B2

(12) United States Patent
Williamson

(10) Patent No.: US 8,463,739 B2
(45) Date of Patent: Jun. 11, 2013

(54) SYSTEMS AND METHODS FOR GENERATING MULTI-POPULATION STATISTICAL MEASURES USING MIDDLEWARE

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 485 days.

(21) Appl. No.: 12/200,194

(22) Filed: Aug. 28, 2008

(65) Prior Publication Data

US 2010/0057777 A1    Mar. 4, 2010

(51) Int. Cl.
*G06F 7/00* (2006.01)
*G06F 17/00* (2006.01)

(52) U.S. Cl.
USPC .......................................... 707/607; 707/756

(58) Field of Classification Search
None
See application file for complete search history.

(56) References Cited

U.S. PATENT DOCUMENTS

| | | | |
|---|---|---|---|
| 5,845,270 A * | 12/1998 | Schatz et al. ................... 706/11 |
| 5,890,167 A | 3/1999 | Bridge, Jr. et al. | |
| 5,978,796 A * | 11/1999 | Malloy et al. .......................... 1/1 |
| 6,189,004 B1 | 2/2001 | Rassen et al. | |
| 6,301,579 B1 * | 10/2001 | Becker .................................. 1/1 |
| 6,360,188 B1 | 3/2002 | Freidman et al. | |
| 6,366,922 B1 * | 4/2002 | Althoff ........................ 707/706 |
| 6,434,435 B1 | 8/2002 | Tubel et al. | |
| 6,434,544 B1 * | 8/2002 | Bakalash et al. ...................... 1/1 |
| 6,594,672 B1 * | 7/2003 | Lampson et al. ..................... 1/1 |
| 6,609,123 B1 * | 8/2003 | Cazemier et al. ..................... 1/1 |
| 6,735,590 B1 * | 5/2004 | Shoup et al. ......................... 1/1 |
| 6,898,560 B1 | 5/2005 | Das | |
| 6,931,418 B1 * | 8/2005 | Barnes .......................... 707/776 |
| 7,058,621 B1 * | 6/2006 | Wolge ................................. 1/1 |
| 7,152,062 B1 | 12/2006 | Draper et al. | |
| 7,299,241 B2 | 11/2007 | Reed et al. | |
| 7,660,822 B1 * | 2/2010 | Pfleger ................... 707/999.107 |
| 2001/0049678 A1 * | 12/2001 | Yaginuma ........................ 707/3 |
| 2002/0029207 A1 * | 3/2002 | Bakalash et al. .................. 707/1 |
| 2002/0035562 A1 | 3/2002 | Roller et al. | |
| 2002/0059195 A1 | 5/2002 | Cras et al. | |
| 2002/0083034 A1 * | 6/2002 | Orbanes et al. ................... 707/1 |
| 2002/0087516 A1 * | 7/2002 | Cras et al. ......................... 707/2 |
| 2002/0169658 A1 | 11/2002 | Adler | |
| 2002/0194196 A1 | 12/2002 | Weinberg et al. | |

(Continued)

OTHER PUBLICATIONS

Using OLAP and Multi-dimensional data for decision making, Hasan et al, IEEE 2001.*

(Continued)

*Primary Examiner* — Pierre Vital
*Assistant Examiner* — Augustine K Obisesan
(74) *Attorney, Agent, or Firm* — Lowenstein Sandler LLP

(57) ABSTRACT

Embodiments relate to systems and methods for analyzing data extracted from a set of data sources. A set of applications such as online analytical processing (OLAP) applications can access the combined data of a set of data sources via an aggregation engine. The set of data sources can be configured with diverse dimensions and associated data. In general the data sources may not be expected to reflect a strictly consistent structure. In embodiments, the aggregation engine can combine or aggregate the set of data sources using common dimensions or data points, and build an index into a transform table reflecting a combined mapping. An OLAP or other application can then perform statistical computations, searches, sorts, and/or other operations on the combined mapping, even when the original data sources do not contain identical dimensions or other formats.

17 Claims, 4 Drawing Sheets

U.S. PATENT DOCUMENTS

| | | | |
|---|---|---|---|
| 2003/0004938 A1 | 1/2003 | Lawder | |
| 2003/0114950 A1* | 6/2003 | Ruth et al. | 700/108 |
| 2003/0115194 A1* | 6/2003 | Pitts et al. | 707/3 |
| 2003/0115207 A1* | 6/2003 | Bowman et al. | 707/100 |
| 2003/0120372 A1* | 6/2003 | Ruth et al. | 700/108 |
| 2003/0126114 A1 | 7/2003 | Tedesco | |
| 2003/0126143 A1* | 7/2003 | Roussopoulos et al. | 707/100 |
| 2003/0154443 A1 | 8/2003 | Papierniak et al. | |
| 2003/0184585 A1 | 10/2003 | Lin et al. | |
| 2003/0195897 A1 | 10/2003 | Agrafiotis et al. | |
| 2003/0200191 A1* | 10/2003 | Pao et al. | 706/47 |
| 2003/0200221 A1 | 10/2003 | Bakalash et al. | |
| 2003/0225736 A1* | 12/2003 | Bakalash et al. | 707/1 |
| 2004/0039736 A1 | 2/2004 | Kilmer et al. | |
| 2004/0088323 A1* | 5/2004 | Elder et al. | 707/103 Y |
| 2004/0133552 A1* | 7/2004 | Greenfield et al. | 707/1 |
| 2004/0139061 A1* | 7/2004 | Colossi et al. | 707/3 |
| 2004/0236767 A1 | 11/2004 | Soylemez et al. | |
| 2004/0243560 A1* | 12/2004 | Broder et al. | 707/3 |
| 2004/0243645 A1* | 12/2004 | Broder et al. | 707/200 |
| 2005/0004904 A1* | 1/2005 | Kearney et al. | 707/3 |
| 2005/0010566 A1* | 1/2005 | Cushing et al. | 707/3 |
| 2005/0015360 A1 | 1/2005 | Cras et al. | |
| 2005/0060300 A1 | 3/2005 | Stolte et al. | |
| 2005/0060382 A1 | 3/2005 | Spector et al. | |
| 2005/0114355 A1* | 5/2005 | Nuttila | 707/100 |
| 2005/0262108 A1 | 11/2005 | Gupta | |
| 2005/0262120 A1 | 11/2005 | Shoup et al. | |
| 2005/0289119 A1 | 12/2005 | Weinberg et al. | |
| 2006/0004816 A1* | 1/2006 | Diewald et al. | 707/101 |
| 2006/0004833 A1* | 1/2006 | Trivedi et al. | 707/102 |
| 2006/0026189 A1 | 2/2006 | Djugash et al. | |
| 2006/0031187 A1* | 2/2006 | Pyrce et al. | 707/1 |
| 2006/0036707 A1 | 2/2006 | Singh et al. | |
| 2006/0116976 A1 | 6/2006 | Legault et al. | |
| 2006/0136462 A1 | 6/2006 | Campos et al. | |
| 2006/0179061 A1* | 8/2006 | D'Souza et al. | 707/10 |
| 2006/0200457 A1* | 9/2006 | McCammon et al. | 707/4 |
| 2006/0206512 A1 | 9/2006 | Hanrahan et al. | |
| 2006/0262145 A1* | 11/2006 | Zhang et al. | 345/661 |
| 2007/0022093 A1* | 1/2007 | Wyatt et al. | 707/2 |
| 2007/0027904 A1* | 2/2007 | Chow et al. | 707/102 |
| 2007/0027930 A1* | 2/2007 | Alvarado et al. | 707/200 |
| 2007/0088757 A1 | 4/2007 | Mullins et al. | |
| 2007/0094236 A1* | 4/2007 | Otter et al. | 707/2 |
| 2007/0112889 A1* | 5/2007 | Cook et al. | 707/204 |
| 2007/0130116 A1 | 6/2007 | Cras et al. | |
| 2007/0156634 A1 | 7/2007 | Martin | |
| 2007/0162472 A1* | 7/2007 | Wan et al. | 707/100 |
| 2007/0208721 A1* | 9/2007 | Zaman et al. | 707/4 |
| 2007/0245118 A1* | 10/2007 | Suponau et al. | 711/216 |
| 2007/0250524 A1 | 10/2007 | Le | |
| 2008/0140696 A1 | 6/2008 | Mathuria | |
| 2008/0162562 A1 | 7/2008 | Hu et al. | |
| 2008/0172405 A1 | 7/2008 | Feng et al. | |
| 2008/0222189 A1 | 9/2008 | Ovanesyan et al. | |
| 2008/0243778 A1 | 10/2008 | Behnen et al. | |
| 2008/0294596 A1* | 11/2008 | Xiong | 707/2 |
| 2008/0320023 A1 | 12/2008 | Fong | |
| 2009/0037440 A1 | 2/2009 | Will et al. | |
| 2009/0099862 A1* | 4/2009 | Fireman et al. | 705/2 |
| 2009/0193039 A1 | 7/2009 | Bradley et al. | |
| 2009/0222470 A1* | 9/2009 | Kemp et al. | 707/102 |
| 2010/0057700 A1 | 3/2010 | Williamson | |
| 2010/0131456 A1 | 5/2010 | Williamson | |
| 2010/0169299 A1 | 7/2010 | Pollara | |
| 2010/0305922 A1 | 12/2010 | Williamson | |
| 2010/0306254 A1 | 12/2010 | Williamson | |
| 2010/0306255 A1 | 12/2010 | Williamson | |
| 2010/0306272 A1 | 12/2010 | Williamson | |
| 2010/0306281 A1 | 12/2010 | Williamson | |
| 2010/0306340 A1 | 12/2010 | Williamson | |
| 2010/0306682 A1 | 12/2010 | Williamson | |
| 2011/0050728 A1 | 3/2011 | Williamson | |
| 2011/0054854 A1 | 3/2011 | Williamson | |
| 2011/0055680 A1 | 3/2011 | Williamson | |
| 2011/0055761 A1 | 3/2011 | Williamson | |
| 2011/0055850 A1 | 3/2011 | Williamson | |
| 2011/0078199 A1 | 3/2011 | Williamson | |
| 2011/0078200 A1 | 3/2011 | Williamson | |
| 2011/0131176 A1 | 6/2011 | Williamson | |
| 2011/0131220 A1 | 6/2011 | Williamson | |
| 2011/0158106 A1 | 6/2011 | Williamson | |
| 2011/0161282 A1 | 6/2011 | Williamson | |
| 2011/0161374 A1 | 6/2011 | Williamson | |
| 2011/0161378 A1 | 6/2011 | Williamson | |

OTHER PUBLICATIONS

A new OLAP aggregation based on the AHC technique, Massaoud et al, DOLAP'04 Nov. 12-13, 2004.*

Interactive hierarchical dimension ordering, spacing and filtering for exploration of high dimension datasets, Yang et al, IEEE symposium on information visualization 2003.*

Answering Joint Queries from Multiple Aggregate OLAP Databases, Pourabbas et al, LNCS 2737, pp. 24-34, 2003.*

ASPFAQ.com, "What Are the Valid Styles for Converting Datetime to String?," (2006) http://database.aspfaq.com/database/what-are-the-valid-styles-for-converting-datetime-to-string.html.

Williamson, "Systems and Methods for Interpolating Conformal Input Sets Based on a Target Output," U.S. Appl. No. 12/872,779, filed Aug. 31, 2010.

Williamson, "Systems and Methods for Interpolating Conformal Input Sets Based on a Target Output," U.S. Appl. No. 12/951,881, filed Nov. 22, 2010.

Williamson, "Systems and Methods for Tracking Differential Changes in Conformal Data Input Sets," U.S. Appl. No. 12/951,937, filed Nov. 22, 2010.

Williamson, "Systems and Methods for Training a Self-Learning Network Using Interpolated Input Sets Based on a Target Output," U.S. Appl. No. 12/872,935, filed Aug. 31, 2010.

Williamson, "Systems and Methods for Embedding Interpolated Data Object in an Application Data File," U.S. Appl. No. 12/955,717, filed Nov. 29, 2010.

Williamson, "Systems and Methods for Generating Interpolated Input Data Sets Using Reduced Input Source Objects," U.S. Appl. No. 12/955,768, filed Nov. 29, 2010.

Williamson, "Systems and Methods for Filtering Interpolated Input Data Based on User-Supplied or Other Approximation Constraints," U.S. Appl. No. 12/955,790, filed Nov. 29, 2010.

Williamson, "Systems and Methods for Binding Multiple Interpolated Data Objects," U.S. Appl. No. 12/955,811, filed Nov. 29, 2010.

Williamson, "Systems and Methods for Generating Portable Interpolated Data Using Object-Based Encoding of Interpolated Results," U.S. Appl. No. 13/037,322, filed Feb. 28, 2011.

Williamson, "Systems and Methods for Generating Interpolation Data Sets Converging to Optimized Results Using Iterative Overlapping Inputs," U.S. Appl. No. 13/037,341, filed Feb. 28, 2011.

Williamson, "Systems and Methods for Generating Interpolation Data Template to Normalize Analytic Runs," U.S. Appl. No. 13/037,332, filed Feb. 28, 2011.

Williamson, "Systems and Methods for Validating Interpolation Results Using Monte Carlo Simulations on Interpolated Data Inputs," U.S. Appl. No. 13/037,344, filed Feb. 28, 2011.

Albrecht et al., "Management of Multidimensional aggregates for Efficient Online Analytical Processing", Proceedings of the 1999 International Symposium on Database Engineering & Applications, p. 156, 1999.

Markl et al., "Improving OLAP Performance by Multideminsional Hierarchical Clustering", Proceedings of the 1999 International Symposium on Database Engineering & Applications, p. 165, 1999.

USPTO, Office Action for U.S. Appl. No. 12/200,101, mailed Dec. 29, 2010.

USPTO, Office Action for U.S. Appl. No. 12/200,101, mailed May 9, 2011.

USPTO, Office Action for U.S. Appl. No. 12/200,101, mailed Oct. 17, 2011.

USPTO, Office Action for U.S. Appl. No. 12/200,101, mailed Feb. 24, 2012.

USPTO, Office Action for U.S. Appl. No. 12/200,101, mailed Aug. 29, 2012.

* cited by examiner

SYSTEMS AND METHODS FOR GENERATING MULTI-POPULATION STATISTICAL MEASURES USING MIDDLEWARE

FIELD

The present teachings relate to systems and methods for generating multi-population statistical measures using middleware, and more particularly to platforms and techniques for combining the data or multiple data sources via a middleware aggregation engine to permit applications to run statistical analyses on the combined data.

BACKGROUND OF RELATED ART

In networked data technologies, the introduction and expanded use of middleware platforms has enabled a wider range of applications access to a wider range of data sources. Middleware platforms in general are known which allow a single application to access diverse or incompatible data sources, by commonizing the data schema used by those separate sources for use by the application.

In the realm of data analysis, packages for statistical analysis are known which are configured to receive data in standardized formats. For example, online analytical processing (OLAP) applications in general manipulate data which is stored in a multi-dimensional format, and manipulate multi-dimensional data to generate reports, statistics, and other outputs. Middleware platforms which attempt to combine multiple data sources for purposes of feeding data to one or more OLAP or other statistical applications can encounter difficulties, however. Those issues include the fact that the diverse data sources will typically not be built with completely common or consistent formats or dimensions. A statistical application which wishes to attempt, for example, to generate an average of data that is merged from multiple sources may find it impossible to locate the desired field in each separate source, and generate an average on the combined set of data. It may be desirable to provide methods and systems for the generation of multi-population statistical measures via middleware, in which a middleware aggregation engine generates a combined data object from multiple data sources, and permits statistical applications to generate reports or other outputs based on the combined data object.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating multi-population statistics using middleware. More particularly, embodiments relate to platforms and techniques for invoking a middleware aggregation engine to identify data sources from a set of data sources that contain data desired by one or more applications. The aggregation engine can for example access one or more online analytical processing (OLAP) or other data sources and extract information responsive to a data request made by a statistical or other application, and combine that information into a larger or aggregate data object. The one or more applications can then run statistical reports or other computations on the combined data object, and produce a set of statistical measures as output. In embodiments, the aggregation engine can allow the original source data in the data sources to remain intact, and only operate on the combined data object. Users of the set of applications can therefore gain outputs and measures on the larger collection of data across separate data sources by generating reports off of the combined data object generated at the middleware level. These and other embodiments described herein address the various noted shortcomings in known database and statistical applications technology, and provide a user operator with an enhanced set of data from which to generate and view statistical and other reports.

Reference will now be made in detail to exemplary embodiments of the present teachings, which are illustrated in the accompanying drawings. Where possible the same reference numbers will be used throughout the drawings to refer to the same or like parts.

Figure 1:
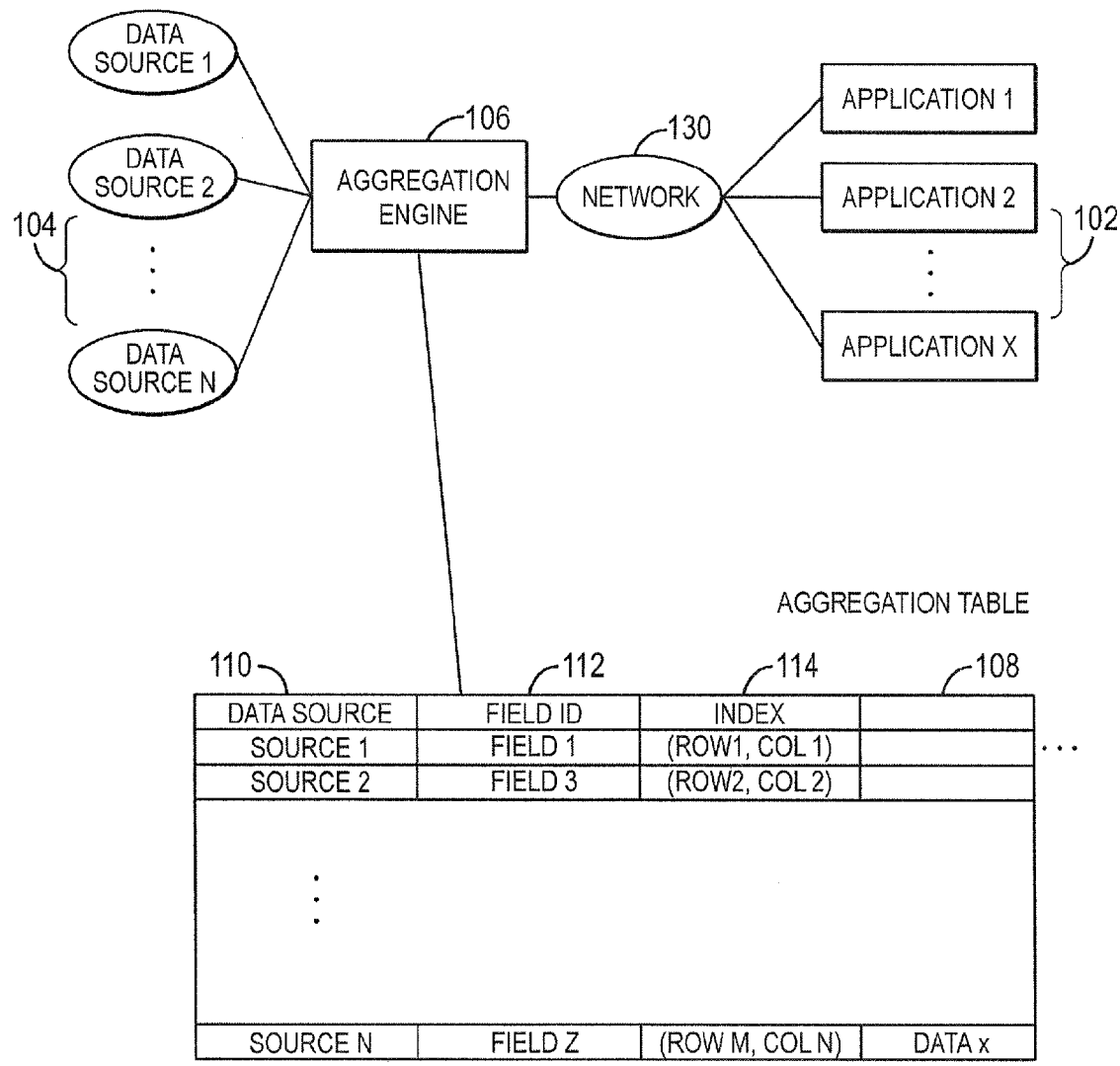
FIG. 1 illustrates an overall system for generating multi-population statistical measures using middleware aggregation, according to various embodiments.

FIG. 1 illustrates an overall system 100 in which systems and methods for generating multi-population statistical measures using middleware can operate, according to various embodiments. A set of applications 102 can communicate with an aggregation engine 106 via one or more network 130. Set of applications 102 can be or include, for example, a set of statistical analysis programs. Set of applications 102 can further include database applications, spreadsheet applications, modeling applications, or other applications. The applications in set of applications can in embodiments be or include online analytical processing (OLAP) applications. One or more network 130 can be or include, for example, the Internet or other public or private networks. Aggregation engine 106 can be, include, or be hosted by a server with associated memory, storage, and other resources configured to receive data requests from one or more application in set of applications 102, and interpret that request to build an aggregate data mapping or structure to respond to that request.

More particularly, and as shown in FIG. 1, aggregation engine 106 can communicate with a set of data sources 104 which host data which set of applications 102 wishes to access. The set of data sources 104 can be or include relational databases, or other data sources. In embodiments, set of data sources 104 can be or include online analytic processing (OLAP) data sources, such as multi-dimensional databases or other data stores. According to embodiments, the set of data sources 104 can be multi-dimensional data sources. In embodiments, other numbers, types, or configurations of data sources can be used.

Aggregation engine 106 can receive a data request from one or more application in set of applications 102, and identify which data source or sources in set of data sources 104 contain data corresponding to the data request. Aggregation engine 106 can then communicate with data sources having corresponding data, and extract that data from the data sources. For example, one or more field, value, dimension or other component of each data source can be read out or retrieved by aggregation engine 106. When all data corresponding to the data request is extracted from set of data sources 104, aggregation engine 106 can aggregate that data into a combined data object 116 that maps the cumulative data structure to be accessed by the requesting application(s). More particularly, in embodiments aggregation engine 106 can generate a aggregation table 108 containing entries mapping the fields, values, dimensions and/or other information extracted from the data sources in set of data sources 104 to an aggregate representation of the subject data. In embodiments, aggregation table 108 can contain fields including a data source field 110 identifying the data source which contributes a dimension, field, or other data. Aggregation table 108 can also include a field identifier 112 representing the original field of the extracted data in its host data source. Aggregation table 108 can further include an index 114, representing a row/column location level at which the extracted field, value, dimensions, or other data is placed in the resulting combined data object 116 produced by aggregation engine 106.

Figure 2:
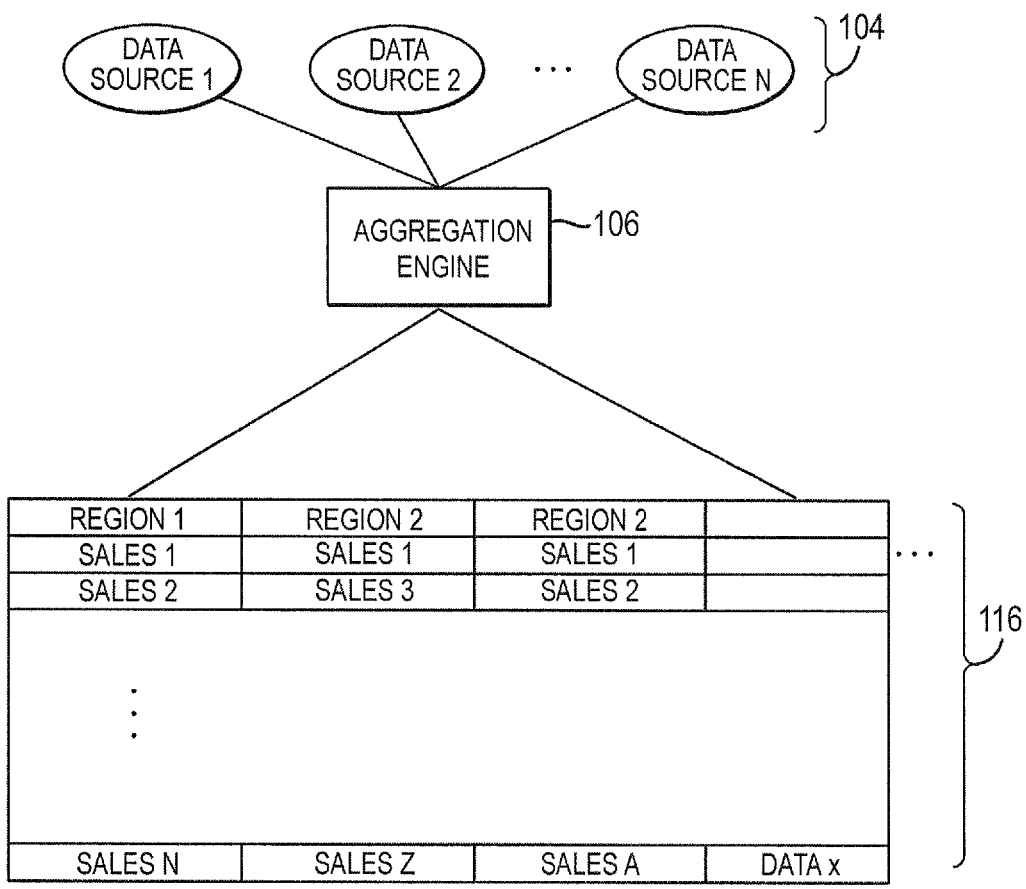
FIG. 2 illustrates a system for generating multi-population statistical measures using middleware aggregation, according to various embodiments in further regards.

As shown, for example, in FIG. 2, the combined data object 116 encoding the aggregate information extracted from set of data sources 104 can comprise a relational data structure, such as a flat two-dimensional table or a multiple-level hierarchical network. Other data schema for combined data object 116, which can be generated, maintained and stored by aggregation engine 106 at the middleware level, can be used. The combined data object 116 can, for instance, be configured as a set of linked nodes, in a linked network configuration. In illustrative embodiments as shown, for example, a combined data object 116 representing a table of all sales collected from regions of a retail, online, mail order, or other sales organization can contain a number of distinct fields reflecting sales figures of different types on a regional level. In embodiments, the regional sales figures for each region can be hosted in a separate data source in set of data sources 104. According to embodiments, set of applications 102 can run statistical analyses on combined data object 116, and thereby generate reports or other outputs based on the collective information across set of data sources 104, in one processing operation. Set of applications 102 can thereby generate more meaningful high-level comparative statistics or other quantitative measures on the constituent data of set of data sources 104, simultaneously.

In embodiments, aggregation engine 106 can for example build combined data object 116 in one regard by identifying common fields, values, dimensions or other data between data sources in set of data sources 104. In embodiments, the relationships or presumed relationships between other fields or other data structures can be generated or projected using, for example, a set of lookup tables defining presumed hierarchical relationships between different keywords or other definitions of source dimensions. Thus, for instance, a field identified as "regional sales" in multiple data sources can be placed at the same row in combined data object 116, even when not referring to the same region or sales territory, to permit comparison and statistical measures to be run on the overall complement of regional sales. In embodiments, relationships or presumed relationships between other dimensions can also be generated or projected using statistical inferences, or using neural networks or other self-learning logic. In embodiments, aggregation engine 106 can store combined data object 116 for further reference, for instance to a data store. In embodiments, aggregation engine 106 can generate combined data object 116, and not store that data to a permanent data store.

In embodiments, aggregation engine 106 can extract data from set of data sources 104 and generate combined data object 116, without altering or destroying the original data contained in the data sources.

Figure 3:
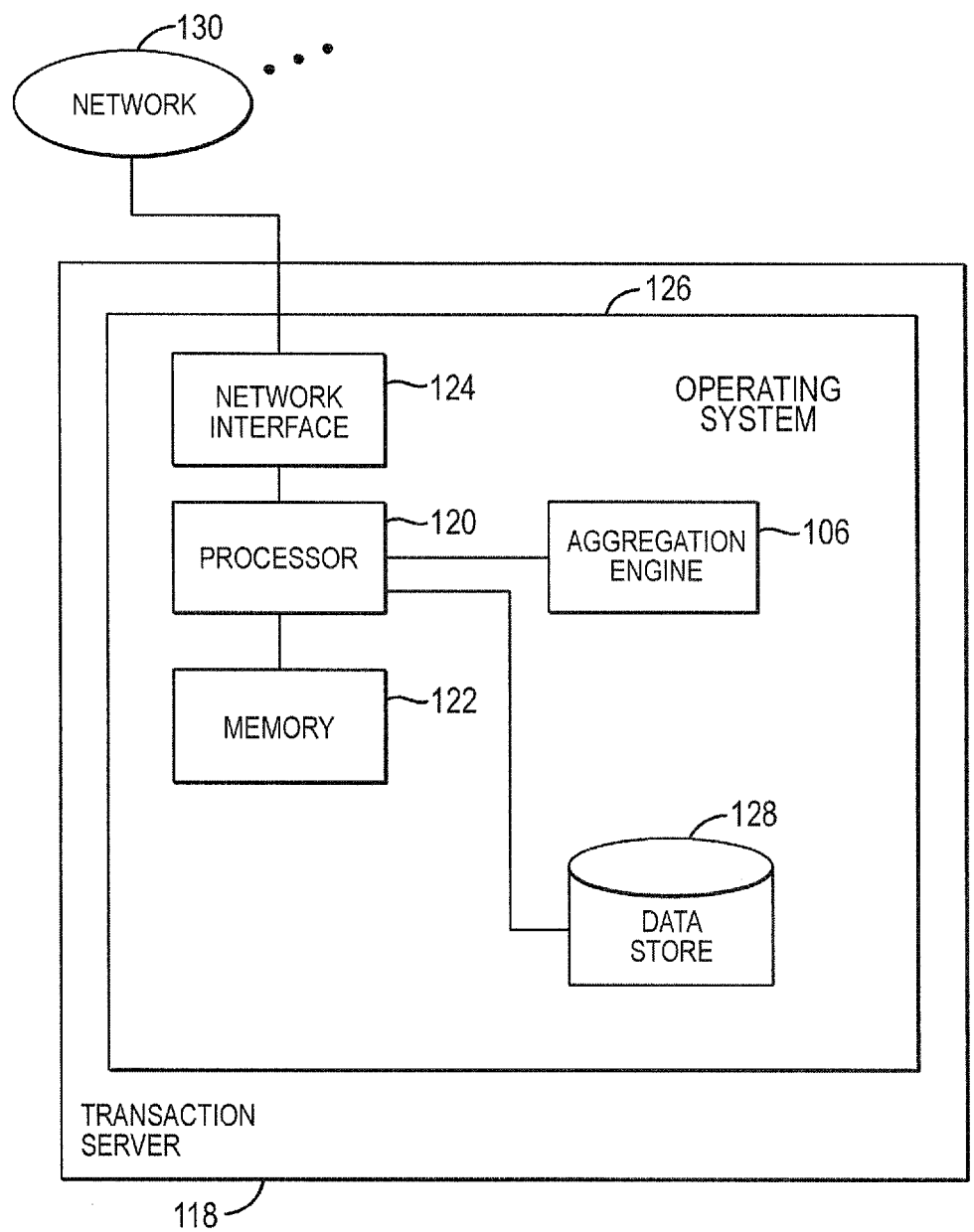
FIG. 3 illustrates an illustrative hardware configuration of hardware that can implement an aggregation engine, according to various embodiments.

FIG. 3 illustrates an exemplary configuration of transaction server 118 which can be used in systems and methods for generating multi-population statistical measures using middleware, according to embodiments. Transaction server 118 can, for instance, support or host aggregation engine 106 in part or whole. In embodiments as shown, transaction server 118 can comprise a processor 120 communicating with memory 122, such as electronic random access memory, operating under control of or in conjunction with operating system 126. Operating system 126 can be, for example, a distribution of the Linux™ operating system, the Unix™ operating system, or other open-source or proprietary operating system or platform. Processor 120 also communicates with data store 128, such as a database stored on a local hard drive. Processor 120 further communicates with network interface 124, such as an Ethernet or wireless data connection, which in turn communicates with one or more network 130, such as the Internet or other public or private networks. Processor 120 can, for example, communicate with set of applications 102 and set of data sources 104 via one or more network 130. Processor 120 also communicates with the aggregation engine 106 and other resources to control the processing of set of data sources 104, including to extract the dimensional data from those sources, locate common fields, nodes, dimensions and/or other data components, and build aggregation table 108 reflecting the aggregation of the data sources into combined data object 116. Other configurations of transaction server 118, associated network connections, and other hardware and software resources are possible.

Figure 4:
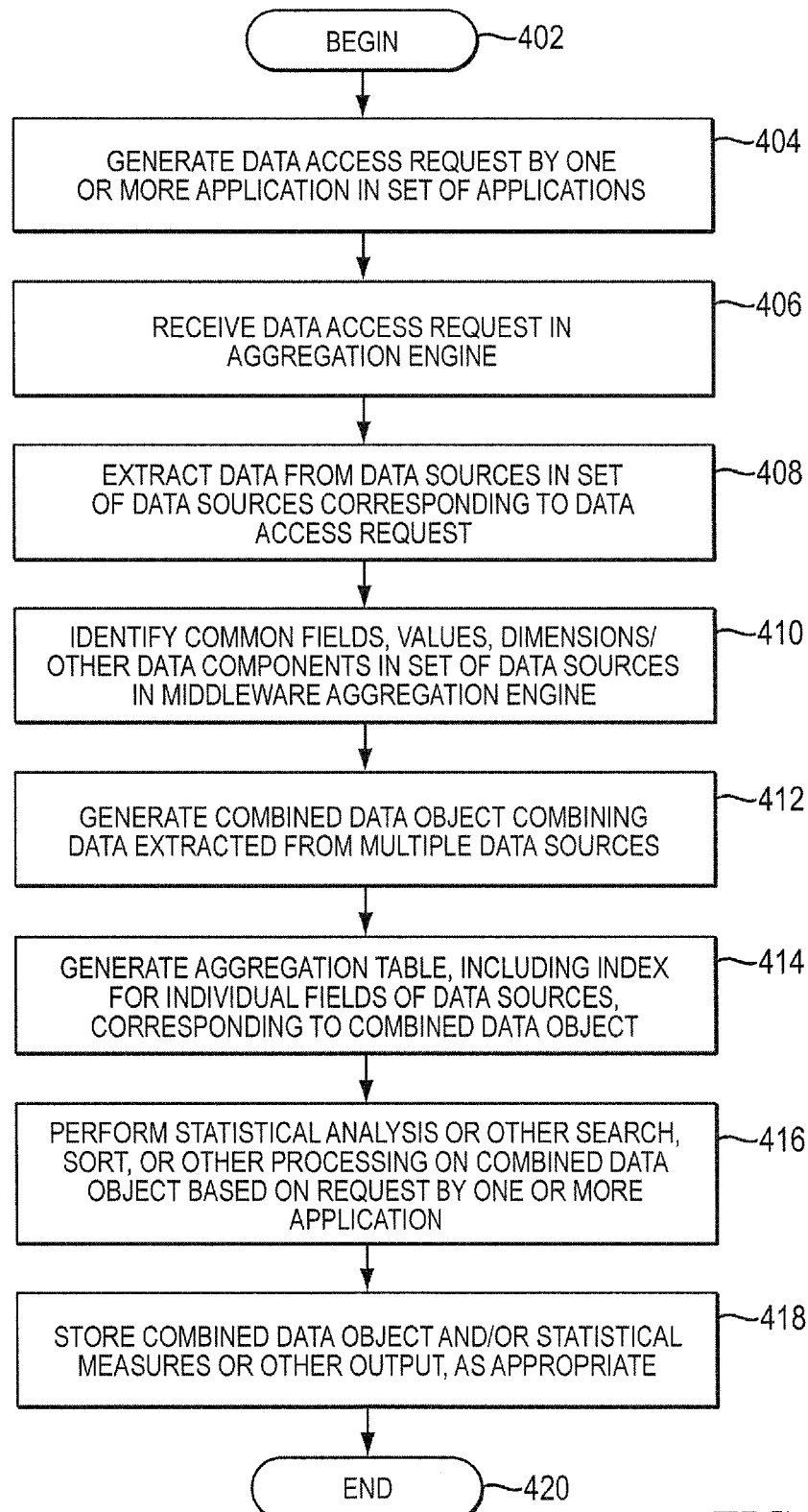
FIG. 4 illustrates overall data aggregation processing to generate statistical measures on a combined data object created from separate data sources using middleware, according to various embodiments.

FIG. 4 illustrates overall processing for the generation of multi-population statistical measures using middleware, according to various embodiments. In 402, processing can begin. In 404, a data access request can be generated by one or more application in set of applications 102. In 406, the data access request can be received in aggregation engine 106. In embodiments, aggregation engine 106 can be a middleware resource hosted in or supported by transaction server 118 or other hardware, software, logic, or other resources configured as middleware located between set of applications 102 and set of data sources 104. In 408, data corresponding to the data request can be extracted from two or more data sources in set of data sources 104 by aggregation engine 106. In embodiments, individual data sources in set of data sources 104 can for instance be or include online analytical processing (OLAP) data sources. In embodiments, set of data sources 104 can instead or in addition include other types of data sources, such as, for example, relational databases.

In 410, aggregation engine 106 can identify one or more fields, values, dimensions, or other data components or structures in common between the two or more data sources in set of data sources 104 supplying data in response to the data request. For example, aggregation engine 106 can discover that the data sources share a dimension of "regional sales" which can be used to order or align common dimensions of the subject data sources.

In 412, aggregation engine 106 can generate a combined data object 116 representing an aggregation or combination of the combined dimensions and/or other data of set of data sources 104 responsive to the data request. In embodiments, combined data object 116 can be or include a hierarchical data object, for example, of types described in copending U.S. patent application Ser. No. 12/200,101 entitled "Systems and Methods for Hierarchical Aggregation of Multi-Dimensional Data Sources," filed of even date herewith, naming the same inventor as this application, assigned or under assignment to the same entity as this application, and which application is incorporated by reference herein. In embodiments, combined data object 116 can in addition or instead be a multi-dimensional data object, such as an online analytic processing (OLAP) database. In embodiments, combined data object 116 can in addition or instead be a relational database, or can have other data schemas.

In 414, aggregation engine 106 can generate an aggregation table 108, including for example an index reflecting the row and column or other ordering of the extracted fields or other data of the data sources in set of data sources 104 related to the data request. In 416, one or more application in set of applications 102 can perform a set of statistical analyses on combined data object 116. For example, an application or applications in set of applications 102 can calculate or generate statistical or numerical measures such as an average, a median, a mean, a linear regression, a least-squares fit, a variance analysis, or other output or measure on any one or more fields or other components of combined data object 116. The requesting application can further perform a search, sort, or other operation or type of processing on combined data object 116 generated by or recorded in aggregation table 106. For example, in a retail sales context, a sorting of the top ten or other number of best-selling movies, books, or other media or product category can be sorted for a given sales period. In 418, aggregation table 108, combined data object 116, and/or other data produced by the aggregation of set of data sources 104 can be stored, for example, stored as a table, tree, multi-dimensional or other data structure or format to data store 128, or other data store or repository. In 420, processing can repeat, return to a prior processing point, jump to a further processing point, or end.

The foregoing description is illustrative, and variations in configuration and implementation may occur to persons skilled in the art. For example, while embodiments have been described in which set of applications 102 contains or comprises a set of statistical applications, in embodiments other numerical or computational applications can be used in set of applications 102, such as, for example, applications for linear analysis, applications for fuzzy logic or other self-learning networks, or other software or applications. For example, while embodiments have been described in which aggregation engine 106 generates and maintains a combined data object 116 by way of an aggregation table 108, in embodiments other structures for establishing and storing the relationship between source dimensions, data, and combined data object 116 or other aggregate output can be used.

Yet further, while embodiments have been described in which a single aggregation engine 106 generates and manages aggregation table 108, in embodiments multiple transform engines, for example hosted on multiple servers, can cooperate to generate mappings between data sources and combined data object 116 and/or other output. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving, by a middleware aggregation engine executed by a processor, a data request from an application, wherein the middleware aggregation engine is in communication with a plurality of data sources;
identifying, by the middleware aggregation engine, which ones of the data sources contain data that corresponds to the data request;
extracting, by the middleware aggregation engine, the data corresponding to the data request from the identified ones of the data sources, wherein the data has different types respective to the identified ones of the data sources;
identifying, by the middleware aggregation engine in the extracted data, a first structure within a first of the identified ones of the data sources and a second structure within a second of the identified ones of the data sources that are in common, wherein first data within the first structure has a different type than second data within the second structure;
generating, by the middleware aggregation engine, an aggregation table with entries that map information in the extracted data from the identified ones of the data sources to a combined data object, wherein each of the entries in the aggregation table comprises an identifier of one of the identified ones of the data sources, an identifier of a field within the one of the identified ones of the data sources, and an index of a location within the combined data object that corresponds to the field within the one of the identified ones of the data sources;
generating, by the middleware aggregation engine from the extracted data and the aggregation table, the combined data object by placing the first data and the second data together within a structure of the combined data object but in separate locations within the structure and without altering the first data or the second data; and
providing, by the middleware aggregation engine, access to the combined data object to the application to perform a set of statistical measures on the combined data object.

2. The method of claim 1, wherein the data sources comprise a plurality of online analytical processing (OLAP) data sources.

3. The method of claim 1, wherein the application comprises an online analytical processing (OLAP) application.

4. The method of claim 1, wherein the set of statistical measures comprises at least one of an average calculation, a mean calculation, a median calculation, a regression calculation, a sorting calculation, a modeling calculation, or a least-squares fit calculation.

5. The method of claim 1, further comprising generating, by the middleware aggregation engine, the set of statistical measures for use in a quantitative analysis performed by the application.

6. The method of claim 5, further comprising storing the set of statistical measures in a data store.

7. A system comprising:
an interface to receive a data request from an application; and
a processor to execute an aggregation engine that is in communication with a plurality of data sources through the interface, wherein the middleware aggregation engine is a middleware module between the application and the data sources, the aggregation engine to:
receive the data request from the interface,
identify which ones of the data sources contain data that corresponds to the data request,
extract the data corresponding to the data request from the identified ones of the data sources, wherein the data has different types respective to the identified ones of the data sources,
identify, in the extracted data, a first structure within a first one of the identified ones of the data sources and a second structure within a second one of the identified ones of the data sources that are in common, wherein first data within the first structure has a different type than second data within the second structure, generate an aggregation table with entries that map information in the extracted data from the identified ones of the data sources to a combined data object, wherein each of the entries in the aggregation table comprises an identifier of one of the identified ones of the data sources, an identifier of a field within the one of the identified ones of the data sources, and an index of a location within the combined data object that corresponds to the field within the one of the identified ones of the data sources;

generate, from the extracted data and the aggregation table, the combined data object by placing the first data and the second data together within a structure of the combined data object but in separate locations within the structure and without altering the first data or the second data, and provide access to the combined data object to the application to perform a set of statistical measures on the combined data object.

8. The system of claim 7, wherein the data sources comprise a plurality of online analytical processing (OLAP) data sources.

9. The system of claim 7, wherein the application comprises an online analytical processing (OLAP) application.

10. The system of claim 7, wherein the set of statistical measures comprises at least one of an average calculation, a mean calculation, a median calculation, a regression calculation, a sorting calculation, a modeling calculation, or a least-squares fit calculation.

11. The system of claim 7, wherein the aggregation engine is further to:

generate the set of statistical measures for use in a quantitative analysis, and store the set of quantitative measures to a data store.

12. A non-transitory computer-readable medium comprising instructions for causing a processor to perform operations comprising:

receiving, by a middleware aggregation engine executed by the processor, a data request from an application, wherein the middleware aggregation engine is in communication with a plurality of data sources;

identifying, by the middleware aggregation engine, which ones of the data sources contain data that corresponds to the data request;

extracting, by the middleware aggregation engine, the data corresponding to the data request from the identified ones of the data sources, wherein the data has different types respective to the identified ones of the data sources;

identifying, by the middleware aggregation engine in the extracted data, a first structure within a first of the identified ones of the data sources and a second structure within a second of the identified ones of the data sources that are in common, wherein first data within the first structure has a different type than second data within the second structure;

generating, by the middleware aggregation engine, an aggregation table with entries that map information in the extracted data from the identified ones of the data sources to a combined data object, wherein each of the entries in the aggregation table comprises an identifier of one of the identified ones of the data sources, an identifier of a field within the one of the identified ones of the data sources, and an index of a location within the combined data object that corresponds to the field within the one of the identified ones of the data sources;

generating, by the middleware aggregation engine from the extracted data and the aggregation table, the combined data object by placing the first data and the second data together within a structure of the combined data object but in separate locations within the structure and without altering the first data or the second data; and providing, by the middleware aggregation engine, access to the combined data object to the application to perform a set of statistical measures on the combined data object.

13. The non-transitory computer-readable medium of claim 12, wherein the data sources comprise a plurality of online analytical processing (OLAP) data sources.

14. The non-transitory computer-readable medium of claim 12, wherein the application comprises an online analytical processing (OLAP) application.

15. The non-transitory computer-readable medium of claim 12, wherein the set of statistical measures comprises at least one of an average calculation, a mean calculation, a median calculation, a regression calculation, a sorting calculation, a modeling calculation, or a least-squares fit calculation.

16. The non-transitory computer-readable medium of claim 12, wherein the operations further comprise generating, by the middleware aggregation engine, the set of statistical measures for use in a quantitative analysis performed by the application.

17. The non-transitory computer readable medium of claim 16, wherein the operations further comprise storing the set of statistical measures to a data store.

* * * * *